United States Patent [19]

Shah et al.

[11] Patent Number: 5,342,191
[45] Date of Patent: Aug. 30, 1994

[54] PLASTICS INJECTION MOLDING DEVICE WITH MULTIPOSITIONING CONSTRUCTION FOR GAS ASSISTED MOLDING

[75] Inventors: Suresh D. Shah, Rochester Hills; David G. Hlavaty, Allen Park, both of Mich.

[73] Assignee: General Motors Corporation, Detroit, Mich.

[21] Appl. No.: 955,767

[22] Filed: Oct. 2, 1992

[51] Int. Cl.⁵ .................................................. B29C 45/26
[52] U.S. Cl. ............................ 425/533; 264/328.3; 264/328.13; 264/572; 425/535; 425/546
[58] Field of Search ............... 425/130, 563, 564, 566, 425/573, 574, 533, 535, 536, 546; 264/328.3, 328.8, 328.11, 572, 328.13

[56] References Cited

U.S. PATENT DOCUMENTS

| | | | |
|---|---|---|---|
| 3,606,171 | 9/1971 | Voelker | 425/569 |
| 4,131,665 | 12/1978 | Bodson et al. | 264/572 |
| 4,153,231 | 5/1979 | Hayakawa et al. | 425/546 |
| 4,676,730 | 6/1987 | Yamasaki | 425/569 |
| 4,740,150 | 4/1988 | Sayer | 425/542 |
| 4,824,732 | 4/1989 | Hendry et al. | 428/542.8 |
| 4,917,594 | 4/1990 | Gellert et al. | 425/566 |
| 4,923,667 | 5/1990 | Sayer | 264/572 |
| 5,044,924 | 9/1991 | Loren | 425/542 |
| 5,054,689 | 10/1991 | Hunerberg et al. | 264/328.8 |
| 5,090,886 | 2/1992 | Jaroschek | 425/130 |
| 5,096,655 | 3/1992 | Baxi et al. | 264/572 |
| 5,127,814 | 7/1992 | Johnson et al. | 425/564 |
| 5,135,703 | 8/1992 | Hunerberg et al. | 264/328.8 |
| 5,204,050 | 4/1993 | Loren | 264/572 |

OTHER PUBLICATIONS

Sae Technical Paper 910897 Feb. 25–Mar. 1, 1991, "Gas Injection Molding of Thermoplastic Composite Window Guidance Channel" Suresh Shah & Dave Hlavaty.

Primary Examiner—Jay H. Woo
Assistant Examiner—Joseph Leyson
Attorney, Agent, or Firm—Randy W. Tung

[57] ABSTRACT

Gas transmission plugs are placed in a supporting strip portion in plastics injection mold tooling so that an appropriate gas assist injection location can be readily selected, and mated, with a gas injection nozzle thereby eliminating the requirement for pre-drilling mold tooling with gas injection points and removing the tooling from the press so that a gas injection nozzle can be installed relative to the selected injection location. The plugs can be made from porous metal or ceramic with pores that are so small that plastics cannot enter the plug to cause pore clogging. Also, linear gas transmitting passages can be laser beam drilled through plugs of steel or other material with diameters that are sufficiently minute to prevent entry of plastics melt and resultant clogging.

13 Claims, 4 Drawing Sheets

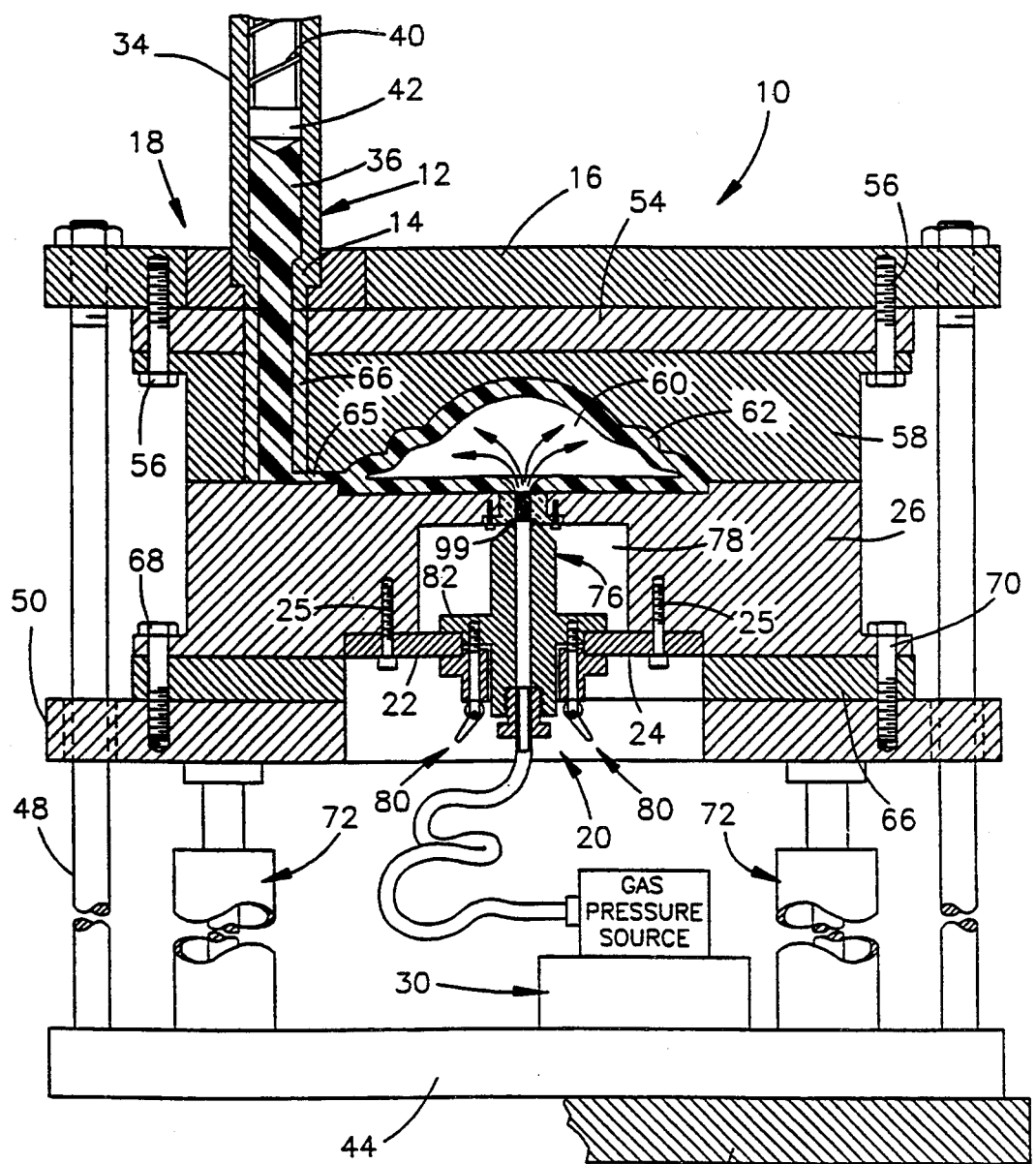
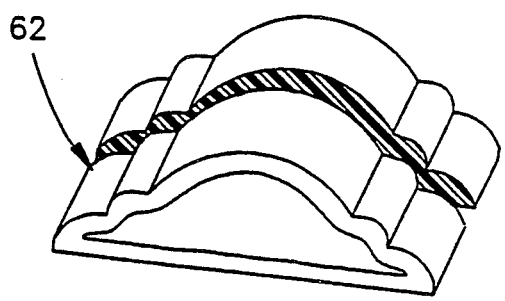
FIG. 1
FIG. 1a

PLASTICS INJECTION MOLDING DEVICE WITH MULTIPOSITIONING CONSTRUCTION FOR GAS ASSISTED MOLDING

FIELD OF THE INVENTION

This invention relates to the injection molding of plastics, and more particularly, to equipment, gas injection plugs and processes for the gas assist injection molding of plastics components in which any of a plurality of gas injection points in the equipment can be readily selected until an optimum point is found for the introduction of pressured gas into plastics melt in a mold cavity for optimizing the production of complete and high quality plastics parts.

DESCRIPTION OF RELATED ART

Prior to the present invention, various gas assist plastics injection molding machines have been designed with plastics injectors for injecting heated short shots of plastics melt into a mold, and with assisting gas injectors mounted at predetermined locations relative to the mold which inject high pressure nitrogen of other inert gas into the melt. The gas expanding from the inner areas of the melt rapidly forces the plastics material to conform to the mold cavity so that a hollow plastics part is thereby formed.

While such machines and molding methods are generally satisfactory for molding small parts having straight forward configurations, and where the supply of the plastics for the melt is uniform in its constituents, difficulties have been encountered in molding parts (1) having complex configurations such as long and narrow parts or curved parts, or (2) where the basic plastics material used to mold the part varies with each supplier and with each delivery from the same supplier.

To overcome such difficulties, it has been necessary to move the gas injection point in an experiential manner until an appropriate gas injection point has been located so that parts are fully completed with good wall thickness in the machine. This required (1) pre-drilling multiple holes up front in the molding tool, removing the tool from the press, locating the gas injection nozzle into selected holes until a point was found for the optimum gas assisted injection molding of the plastics part, or (2) providing multiple nozzles that have to be independently controlled in the tool and sequenced for the injection of gas through selected nozzles until a nozzle was identified for optimizing the gas assist injection molding of the plastics.

This extensive tool revision and required tool downtime to conduct burdensome preliminary molding operations to discover the optimum injection point for gas assist, detracted from promising economy that often accompanies gas assist injection molding of plastics.

SUMMARY OF THE INVENTION

In this invention, the injection molding equipment includes mold tooling provided with a metal strip having a plurality of gas transmitting cylinders or plugs which have laser beam drilled gas passages, or which have a porosity that will transmit the assist gas into and out of the mold cavity. The diameter of these passages or the pore size range is so minuscule that their clogging with the plastics melt is inhibited.

A gas injection nozzle, retractable or non-retractable, can be positioned on tracks and locked in place and readily moved from one position to another without tool revision or tool removal from the associated press. This invention advantageously provides cost saving for tool revision, and importantly, reduces the development lead time for optimizing the assist gas injection point by the gas injector which can be rapidly changed with minimal effort.

BRIEF DESCRIPTION OF THE DRAWINGS

FIG. 1 is a diagrammatic view generally in cross-section, and partly broken away of injection molding equipment with separate plastics and gas injectors;

FIG. 1a is a pictorial view of an elongated plastics part molded by the equipment of FIG. 1;

DETAILED DESCRIPTION OF THE DRAWINGS

Figure 2:
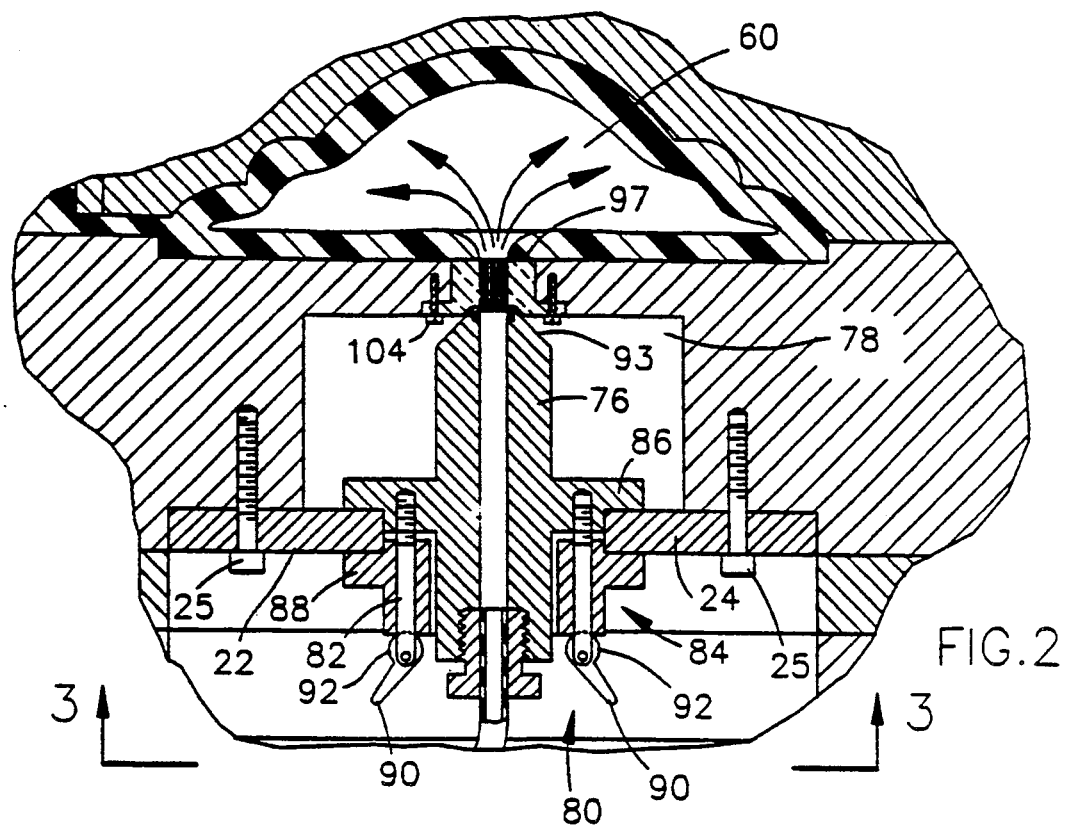
FIG. 2 is an enlarged view of a portion of FIG. 1 illustrating the gas injector in charging the melt with inert gas and forcing the melt as a wall against the contours of the cavity.

Turning now in greater detail to the drawing, there is diagrammatically shown in FIG. 1 injection molding equipment 10 comprising a plastics injector unit 12 that may be the same as that in our co-pending application Ser. No. 07/935,315, entitled GAS INJECTOR WITH RETRACTABLE NOZZLE FOR ASSIST OF PLASTICS INJECTION MOLDING, filed Aug. 26, 1992, assigned to the assignee of this invention and hereby incorporated by reference. The plastics injector unit 12 has a nozzle end 14 operatively connected to a fixed platen 16 of a mold assembly 18 and further has a gas injector 20 mounted for adjustable positioning along a pair of laterally spaced side-by-side tracks 22, 24 secured by threaded fasteners 25 to a lower molding tool or mold half 26 of the mold assembly. Additionally, the molding equipment includes controls incorporated in a control panel 30 for controlling the operation of the injection molding equipment including operation of the plastics injector unit, the mold assembly and the gas injector 20.

The plastics injector unit 12 is utilized to heat and bring the plastics material to a viscous state within a predetermined temperature and density range and to homogenize the plastics into a melt and inject the plastics as a short shot (about 70% of mold cavity capacity) into the mold assembly 18. More particularly, the plastics injector unit 12 has a cylindrical barrel 34 with a passage therethrough that connects to a melt accumulator chamber 36 and the injector nozzle 14 at the end of the barrel. The plastics injector unit has an elongated screw 40 operatively mounted in barrel 34 and headed at its distal end by a one way valve 42 which allows the melt to be fed into the accumulator chamber. This valve blocks the return of the melt from the chamber into the barrel above the head of the screw on the linear stroking movement of the screw by an injection piston, not shown, so that a predetermined quantity or "short shot" of plastics melt is injected under a high pressure into the mold assembly.

The mold assembly 18 comprises a base plate 44, mounted to a support 46 that has a plurality of tie rods 48 extending therefrom through bushings in a movable rectilinear platen 50. The rods are secured at their outboard ends to the fixed platen 16 by threaded fasteners. The relatively movable platens are in alignment with one another and form a press used to support and open and close the mold tool halves of the mold assembly.

Mounted interiorly of the fixed upper platen 16 by means of a retainer plate 54 and threaded fastener 56, is an upper molding tool 58 that in cooperation with the mating lower molding tool 26 provides a profiled mold cavity 60. This mold cavity is elongated so that the long and thin hollow channel 62 of FIG. 1a can be molded therein. The cavity 60 is connected to the plastics injector 12 by a runner 64 and cylindrical sprue bushing 65 provided in the upper molding tool 58 that extends from the outer end of the runner to the nozzle end 14 of the injector, as illustrated in FIG. 1.

The lower or second mold tool 26 is mounted on a retainer plate 66 and is secured thereto by threaded fasteners 68 which extend through flange 70 into threaded engagement with the lower platen 50. The lower platen is movably mounted on the tie rods 48 by the controlled action of hydraulic cylinders 72. These cylinders are supported on the base plate 44 and have fluid pressure movable pistons therein with piston rods operatively connected to lower platen 50 for moving the platen on the tie rods for opening and closing the mold assembly. The controls of control panel 30 are selectively employed to feed, discharge and monitor pressure oil used to open and close the mold assembly. The mold tooling can accordingly be closed and the cavity supplied with a short shot of plastics melt, and after the hollow channel 62 has been molded in cavity 60, moved to an open position so that the channel 62 can be ejected with conventional ejector pins or other devices associated with the tooling, which are not shown.

The gas injector 20 comprises a generally cylindrical nozzle assembly 76 that is movably positioned in an elongated linear channel 78 formed in the mold tool 26 below and in alignment with cavity 60 by over center camming clamps 80. As shown, each of the clamps has an elongated shaft 82 that extends from their clamping cams through an openings in an annular clamping collar 84 and associated openings in an annular flange 86. Flange 86 radially extends from the main body of the nozzle assembly over the inside surface of the laterally spaced tracks 22, 24. The clamping collar 84 has an annular flange 88 that extends over the outside surface of the tracks so that the tracks 22, 24 are disposed therebetween. By turning the cam handles 90, the cams 92 of the clamps are turned so that the clamping flanges of the clamping collar and the nozzle assembly are drawn together to grip the tracks and thereby secure the nozzle assembly 76 in a fixed position on the tracks. In this position, the outer end of a gas centralized gas feed passage 91 terminating at the forward end of the conical tip 93 of the nozzle assembly can be aligned with any selected one of a number of gas transmitting metal cylinders or plugs 94 that are spaced from one another in fixed positions in an elongated tapered recess 95 of metal strip 96. The metal strip is fixed in an elongated groove 98 formed in the tool 26. The inner end of the nozzle assembly 76 is fitted with a suitable annular seal 99 movably mounted by spring means therein to seal against the bottom of the tapered recess to prevent leaks of nitrogen when the nozzle is aligned with a plug 94 and gas is injected into the melt.

The interior face 97 of the strip matches or aligns with the interior surface of the cavity 60 so that the cavity is complete with a continuous wall. The strip 96 can be formed with flanges 102 so that threaded fasteners 104 can be employed to secure the strip to the mold tool 26 in position relative to the cavity 60.

Figure 2A:
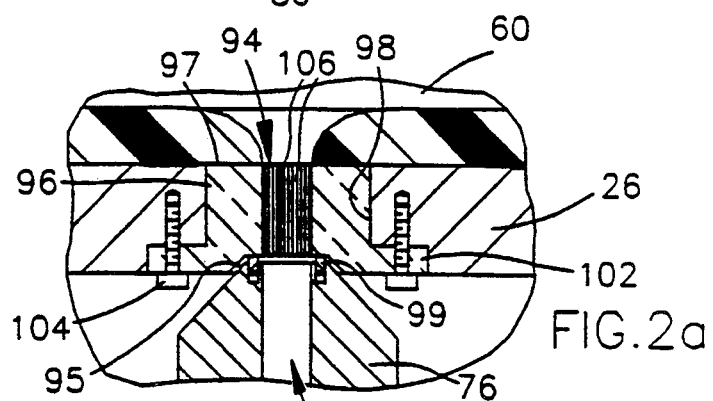
FIG. 2a is an enlarged view of a portion of FIG. 2 showing the nozzle of the gas injector and a gas transmitting plug in molding equipment.

The gas transmitting plugs 94 are preferably cylindrical members of hardened P20 steel that are laser beamed drilled with a plurality of parallel passages 106 illustrated in FIG. 2a. These passages are so minute in diameter that the plastics melt cannot enter into the mouths of these passages to stop them up or adhere to the surfaces therefor. For example, the passages are drilled to have a diameter of 0.0010–0.0060 inches so that molecules of nitrogen, or other inert assist gas, can pass therethrough with minimized pressure drop while the outer surface or the skin of the melt cannot enter and block these passages.

In operation, the heated engineering plastics material is injected as a short shot into the cavity and the gas injector 20 which has been located at a first station, such as station B, injects gas a short time after the melt injection. The pressurized gas expands from the interior of the melt and forces the plastics material against the wall of the cavity and the molded part is allowed to set up and cool to a point at which the mold tooling can be opened and the part ejected. The part is then physically tested for part completeness, wall thickness, and for uniformity in the outer surface of the wall. If all criteria are met, the operator is advised that station "B" is an appropriate injection station for the gas injector.

In the event that gas injection through station "B" proves to produce parts that are rejected for failure to meet part standards, station "A" can be selected and the gas injector easily moved into alignment position therewith so that a plastics injection molding procedure can be attempted. If station "A" proves to be the appropriate station, the equipment will be set up for gas assisted quantity injection molding using this station.

Assuming the material for plastics molding is received from a source different from the first source or even from the same source, the plastics material supplied to the plastics injector may be different from the original material although within specifications. If parts produced with this new supply of plastics fail to meet requirements, the gas injector can be readily moved back to station "B" or other stations such as station "C", "D", "E" or "F" until part quality is again achieved.

Accordingly, this invention provides wide flexibility without arduous or excessive machine down time and high quality parts can be produced with a range of materials that vary from shipment to shipment and from different suppliers.

Figure 4:
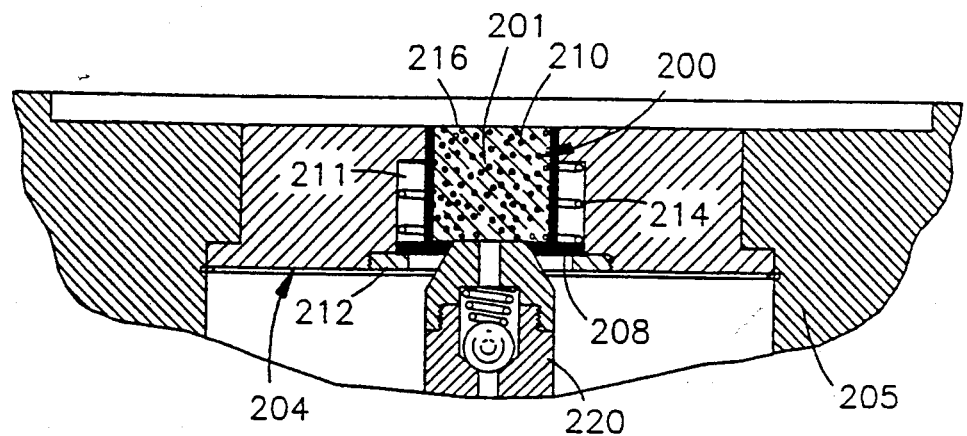
FIG. 4 is a view somewhat similar to the view of FIG. 2a showing another preferred embodiment of the invention in which the plugs are spring biased for axial movement in their support strip.

FIG. 4 illustrates a gas transmitting plug 200 of porous metal or ceramic material formed to provide axial gas transmitting passages through the central areas thereof and which is operatively mounted in an elongated strip 204 fastened in mold tooling 205. This tooling cooperates with upper tooling 206 to form cavity 207 and is substantially the same as the mold tooling of the first described embodiment and is used with injection molding equipment of FIG. 1.

More particularly, the plug has an outer annular head 208 at the outer end of the cylindrical stem portion 210 thereof so that it can be trapped in a counter bore or cylindrical recess 211 in the strip by a snap ring 212 or other fastener. The gas transmitting plug is biased to the FIG. 4 position by a helical spring 214, disposed between the plug head 208 and the bottom of the counter bore. The spring 214 accordingly yieldably biases the plug to a position at which the inner face 216 thereof is even with the inner surface and forms a portion of the surface of the mold cavity. The outer areas 219 of the plugs 200 are sintered or otherwise coated with a sealing material so that nitrogen gas will not leak around the plug to the exterior during a gas injection operation. Since the gas is confined with the interior of the short shot of melt, the gas will not be able to flow out of the other plugs as the plastics material is forced onto the walls defining the mold cavity.

Figure 3:
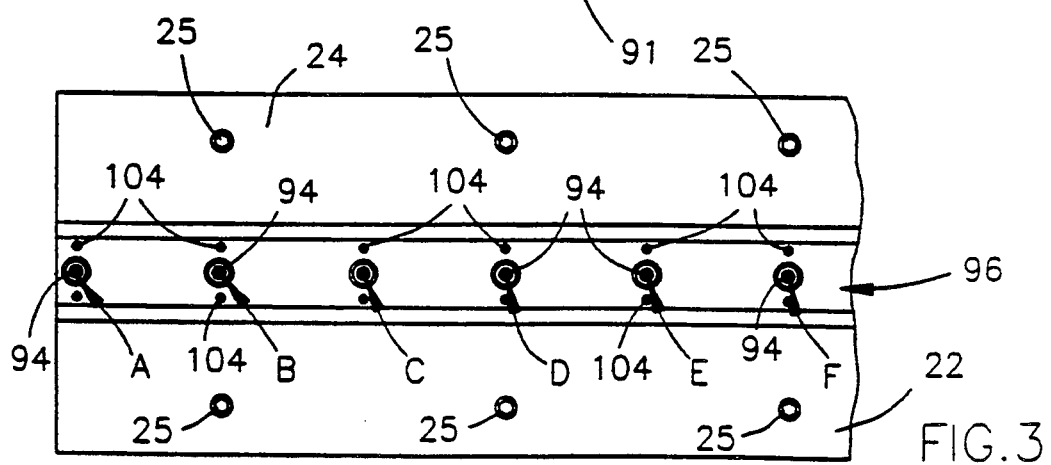
FIG. 3 is a bottom view taken generally along sight lines 3—3 of FIG. 2, but with the gas injector removed to show the gas injector plug strip in the tooling.
Figure 5:
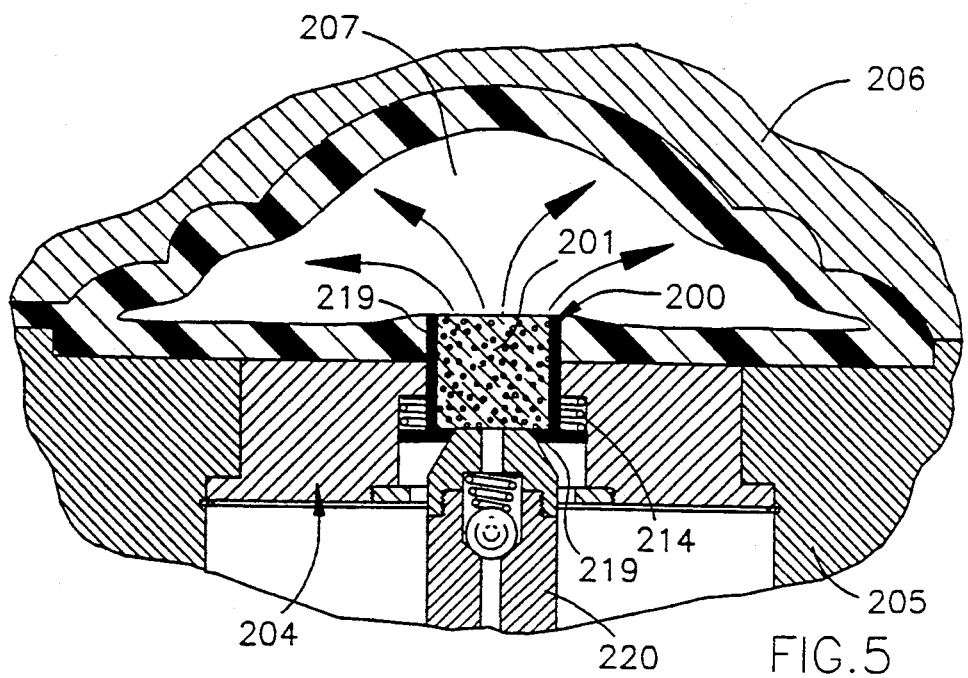
FIG. 5 is a view similar to FIG. 2 illustrating the gas injection plug moved to an gas injection position by a retractable gas injector.

FIG. 5 illustrates the gas transmitting plug 200 moved to a pressure gas assist position by a retractable gas assist nozzle 220. As shown, this plug is axially moved to a position within the cavity of the tooling by the nozzle 220 so that a better distribution of gas is obtained for forming a higher quality part. As in the previous embodiments, the plugs 200 may be located at stations "A through F", as illustrated in FIG. 3, to provide the flexibility to determine the most appropriate station into which to inject gas for high quality and quality production.

After gas injection, the nozzle is moved to a retracted position and away from strip 204 to allow the nitrogen gas to escape through passages in the tooling.

Figure 5A:
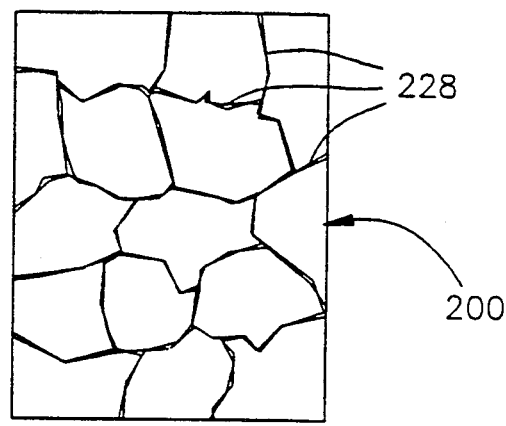
FIG. 5a is a diagrammatic view of microstructure of the porous material of the plugs of FIGS. 4 and 5 illustrating porosity adjacent to the boundaries of the grains thereof.

FIG. 5a is a diagram of a portion of the plug 200 enlarged to illustrate its porosity. The pores 228 are sized so that the plastics melt cannot enter the plugs to cause them to clog.

Figure 6:
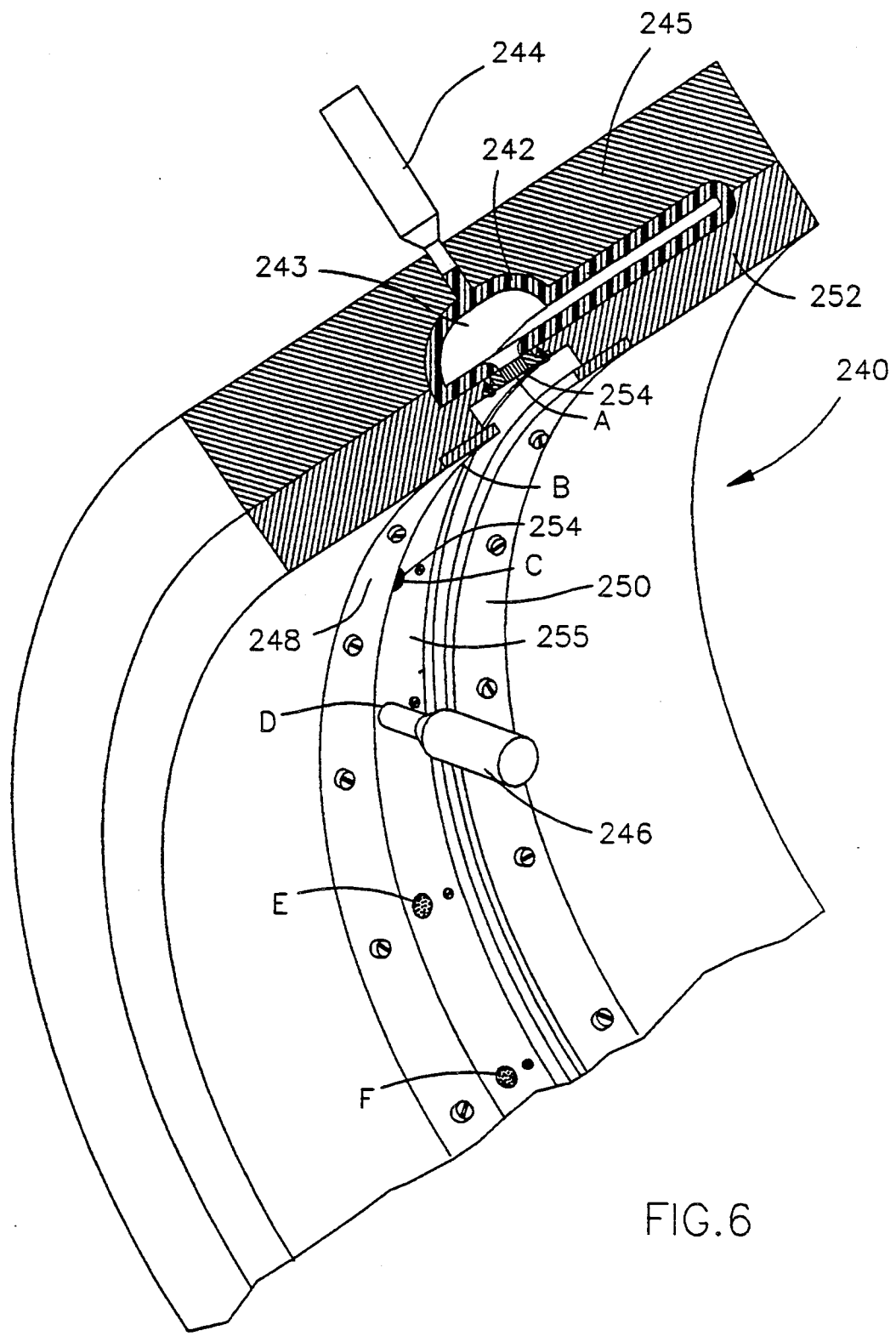
FIG. 6 is a pictorial view of another embodiment of this invention illustrating gas assisted plastics injection molding equipment molding of an elongated and curved part.

In FIG. 6, a portion of a molding apparatus 240 is shown in which a curved part 242 is formed in the cavity 243 of the form by the separable mold tooling. This equipment is substantially the same as that of the other embodiments except for the curvature of the tooling. Plastics melt is injected into the cavity 243 through the plastics injector 244 fixed to upper tooling 245 and the nitrogen gas is injected through movable gas assist injector 246 that is selectively positioned along the tracks 248, 250 of the lower tooling 252.

As in the previous embodiments, stations A through F may be serially and experimentally selected for determining the optimal gas injection point for assist of the injection molding of a particular supply of plastics material. After determining which station best produces a high quality part, shown for example at station D in FIG. 6, that station is used until it becomes necessary to again move the gas injector for molding of high quality parts.

The plugs 254 in stations A through F of curved support strip 255 are like those of FIGS. 1-2 or those in FIGS. 3-4 and may be laser beamed drilled, or of a porous metal of ceramic material as such as disclosed in our co-pending application Ser. No. 07/935,327, filed Aug. 26, 1992. The size of the laser beam passages of the plugs or porosity of the material is closely controlled so that the plastics material cannot enter into passages in the plugs or pores in the porous material cause clogging or material adherence thereto.

While a preferred embodiment of the invention has been shown and described, other embodiments will now become apparent to those skilled in the art. Accordingly, this invention is not to be limited to that which is shown and described but by the following claims.

What is claimed is:

1. A tool for a gas assisted plastics injection molding apparatus having plastics injector means associated therewith for injecting a short shot of plastics into said tool and having a gas injector associated therewith for injecting pressurized assist gas into said tool, said tool comprising a body having a cavity therein for receiving a short shot of plastics material from the plastics injector means, a support strip operatively mounted in said body having a plurality of discrete gas conducting plugs supported therein, each of said plugs being defined by a body member having an injection gas entrance and an injection gas exit at opposing end portions thereof, each of said plugs supported in said support strip extending completely through the support strip, said injection gas exit of each of said plugs being in communication with said cavity, each of said plugs having a plurality of gas passageways operatively connecting said injection gas entrance to said injection gas exit, said passageways being dimensioned so as to transmit the molecules of assist gas from the gas injector into said cavity and to inhibit the entrance of plastics material therein and the clogging thereof, said plugs being spaced from one another at distances along said strip for alignment of the gas injector with any selected one of said plugs to effect the supply of assist gas therein to force the short shot of plastics material against the wall of the cavity to thereby form a molded part.

2. The tool of claim 1, wherein said gas passageways of said plugs have a diameter range of 0.0010–0.0006 inches to allow the assist gas to be injected with low pressure drop and to inhibit the clogging thereof by said plastics material.

3. The tool of claim 1, wherein said plugs are formed from porous material and have a pore size range that is sufficiently small to prevent the pores thereof from becoming clogged with plastics material but are sufficiently large to allow the passage of the molecules of the assist gas therethrough.

4. The tool of claim 1, and further comprising mounting means for mounting said gas conducting plugs for axial movement in said strip of said tool and relative to said cavity between a first and retracted position away from said cavity and a second and extended position into said cavity and in which gas is to be injected therein for the gas assist injection molding of said short shot of plastics material.

5. The tool of claim 1, and further comprising separate counter-bored passages formed through said strip for respectively and separatively receiving said plugs therein and communicating with said cavity, each of said gas conducting plugs having a cylindrical body with a head portion at one end thereof that forms said injection gas entrance and, each of said plugs being mounted for linear movement in said counter-bored passage associated therewith, each of said plugs having spring means mounted around said body member and seated in said associated counter-bored passage in said strip for exerting a retracting force on said plugs directed away from said cavity and stop means in said strip for contacting said head portion of each said plug to limit the linear movement of each of said plugs in said strip so that said plugs can be selectively moved between a gas inject position in which said plug is moved toward said cavity and a retracted position away from said cavity in which said head portion of said plug contacts said stop means.

6. Plastics injection mold tooling having a mold cavity therein for receiving a short shot of plastics melt therein, an elongated opening extending through said mold tooling communicating with said cavity, gas injection assist construction for transmitting assist gas into said mold cavity, said assist construction including a gas injector for injecting pressurized assist gas into a short shot of plastics melt in said cavity so that a plastics part will be molded to conform to the walls defining said cavity, said assist construction further including an elongated support strip secured to the mold tooling for closing said elongated opening therein, fastener means for securing said support strip to said mold tooling, a plurality of openings spaced from one another and extending completely through said support strip, a plurality of gas transmitting plugs spaced from one another and operatively mounted in said openings in said support strip, each of said plugs having a gas inlet end for receiving gas from said gas injector and having a gas discharge end for feeding pressure gas into said short shot of plastics melt to force the material of said melt as a wall against the profile of said cavity, and support means on said tooling for movably supporting said gas injector in a path corresponding to said support strip so that any one of said plugs can be selected and used for the transmittal of gas into said short shot.

7. The mold tooling of claim 6, and further comprising track means providing said support means, and wherein the gas injector for said pressurized gas includes track receiving means which allow said injector to be moved on said track means and aligned with any selected one of said plugs and further including releasable fastening means carried by said gas injector and operable so that said injector can be secured to said track means in a position aligned with any selected one of said plugs.

8. The mold tooling of claim 6, and wherein each of gas transmitting plugs has a plurality of gas transmitting passages extending therethrough that are dimensioned to transmit gas into said short shot of plastics melt while preventing said plastics melt from entering and clogging said passages.

9. The mold tooling of claim 6, and wherein each of said plugs being of a hardened steel and having a plurality of gas transmitting passages drilled therethrough with a diameter range of 0.0010–0.0060 inches.

10. The mold tooling of claim 6, wherein at least some of said plugs are formed from a porous material.

11. The mold tooling of claim 6, wherein said plugs are rigidly secured in said support strip.

12. The mold tooling of claim 6, further including means independently mounting each of said plugs for axial movement in said support strip between a retracted position away from said cavity and an extended position in which each of said plugs extends into said cavity.

13. Mold tooling for gas assisted plastics injection molding adapted to receive pressurized gas from a gas injector with a gas injection nozzle selectively movable with respect to said mold tooling to contact one of a plurality of gas injection stations, said mold tooling comprising body means with a molding cavity therein for receiving a short shot of plastics melt from a plastics injector associated with said tooling, a plurality of gas transmitting plug means for transmitting gas from said injector into said cavity defining the plurality of gas injection stations, each of said plug means having a gas entry head portion adapted to be selectively contacted by the gas injector nozzle and a gas exit end portion for directing pressurized gas into said short shot of plastics material, plug support means removably secured to said body means and supporting each said plug means in spaced relationship with respect to one another, fastener means for removably securing said support means to said body means so that said plug means transmits pressurized assist gas fed thereto from said gas injector into said short shot of plastics melt, said gas transmission plug means having minute gas passage means extending from said head portion to said exit end portion to transmit said assist gas directly into said short shot to force the plastics material of the melt against the wall defining said cavity to form a plastics part with a hollow interior, said gas passage means being sized so as to prevent the entry of said plastics melt therein and resulting clogging of gas passage means and said plug means.

* * * * *